United States Patent
Olesinski et al.

(10) Patent No.: US 7,616,573 B2
(45) Date of Patent: Nov. 10, 2009

(54) FAIR WRED FOR TCP UDP TRAFFIC MIX

(75) Inventors: Wladyslaw Olesinski, Kanata (CA);
Steve Driediger, Kanata (CA)

(73) Assignee: Alcatel Lucent, Paris (FR)

(*) Notice: Subject to any disclaimer, the term of this patent is extended or adjusted under 35 U.S.C. 154(b) by 813 days.

(21) Appl. No.: 10/864,365

(22) Filed: Jun. 10, 2004

(65) Prior Publication Data

US 2005/0276221 A1    Dec. 15, 2005

(51) Int. Cl.
 *H04L 12/26*    (2006.01)
(52) U.S. Cl. ...................................... 370/235
(58) Field of Classification Search ............... 370/229, 370/230, 235, 412–420
See application file for complete search history.

(56) References Cited

U.S. PATENT DOCUMENTS

| | | | | |
|---|---|---|---|---|
| 6,671,258 | B1 * | 12/2003 | Bonneau ...................... | 370/235 |
| 6,894,974 | B1 * | 5/2005 | Aweva et al. .............. | 370/230.1 |
| 2003/0103458 | A1 * | 6/2003 | Shin ............................ | 370/230 |
| 2004/0196845 | A1 * | 10/2004 | Kunze et al. ................ | 370/392 |

FOREIGN PATENT DOCUMENTS

EP    1122916    8/2001
EP    1227624    7/2002

OTHER PUBLICATIONS

Sisalem, D., et al., LDA + a TCP-friendly adaptation scheme for multimedia communication, IEEE, vol. 3, Jul. 30, 2000.
Lin, Dong, et al., Dynamics of Early Random Detection, Division of Engineering and Applied Sciences, Harvard University, 1997.
Floyd, Sally, et al., Router Mechanisms to Support End-to-End Congestion Control, Network Research Group, Berkley National Laboratory, Berkley, Ca, Feb. 15, 1997.
Ott, Teunis J., et al., SRED: Stabilized RED, IEEE, 1999.
Pan, Rong, et al., CHOKe a Stateless active queue management scheme for approximating fair bandwidth allocation, Stanford University, Jun. 12, 1999.

* cited by examiner

*Primary Examiner*—Seema S Rao
*Assistant Examiner*—Mon Cheri S Davenport
(74) *Attorney, Agent, or Firm*—Kramer & Amado, P.C.

(57) ABSTRACT

A Weighted Random Early Detection (WRED) algorithm is described. The WRED algorithm provides fairness to responsive TCP and non-responsive UDP traffic at a buffer of a communications system. Because TCP traffic is responsive to congestion occurrences while UDP traffic is not, without controls, UDP will monopolize the buffer bandwidth. This invention solves the problem by applying congestion control alogrithms to TCP and UDP traffic separately. Discard thresholds for UDP traffic are dynamically modified in a manner that limits UDP traffic to a provisioned percentage of the buffer's available bandwidth, while a traditional WRED algorithm is applied to TCP traffic.

23 Claims, 2 Drawing Sheets

Simulation Model

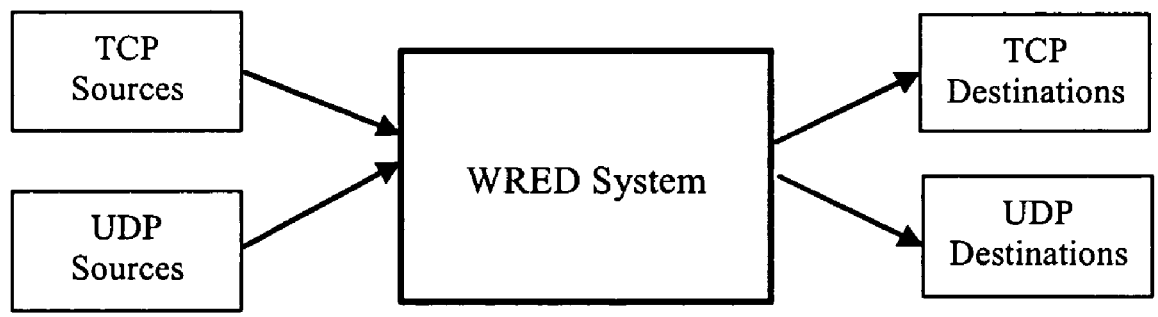
Figure 1 Simulation Model
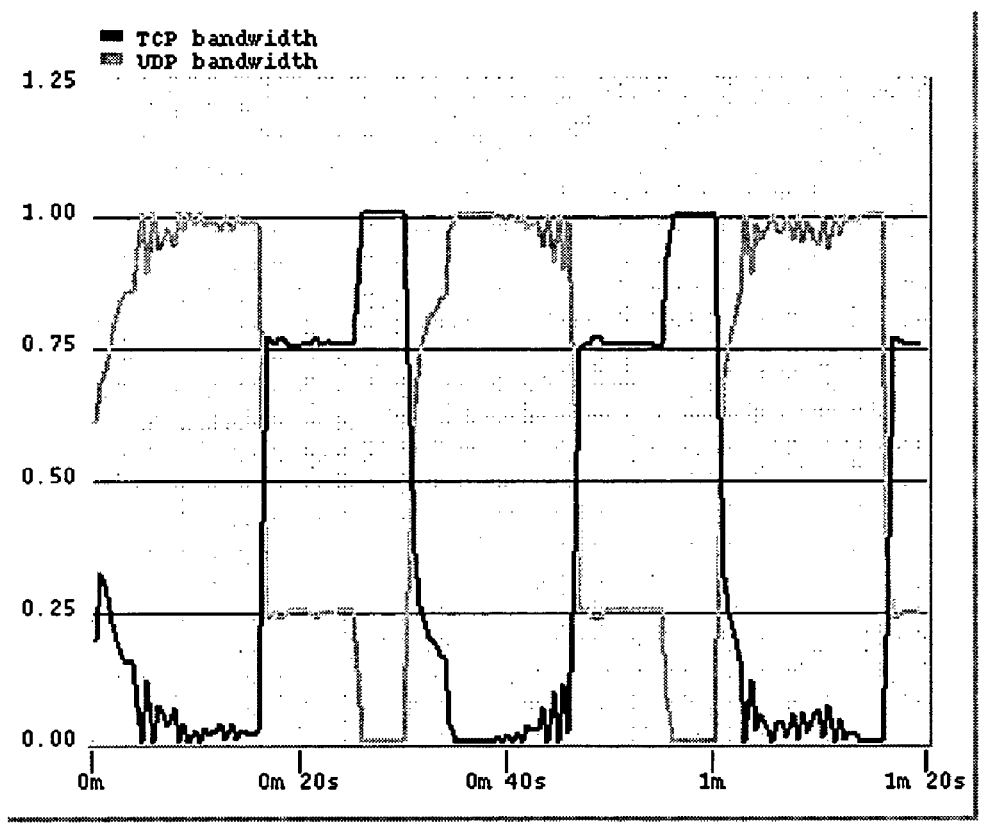
Figure 2 Throughput in basic WRED – Prior Art

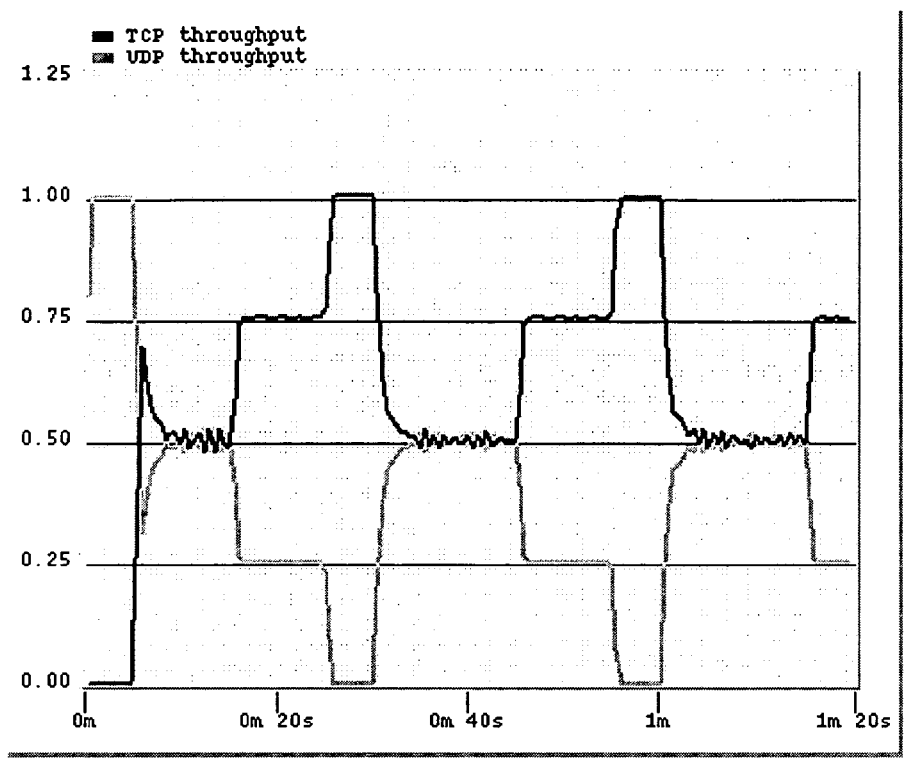
Figure 3 Throughput of 1QRD-WRED – According to the First Embodiment of the Invention
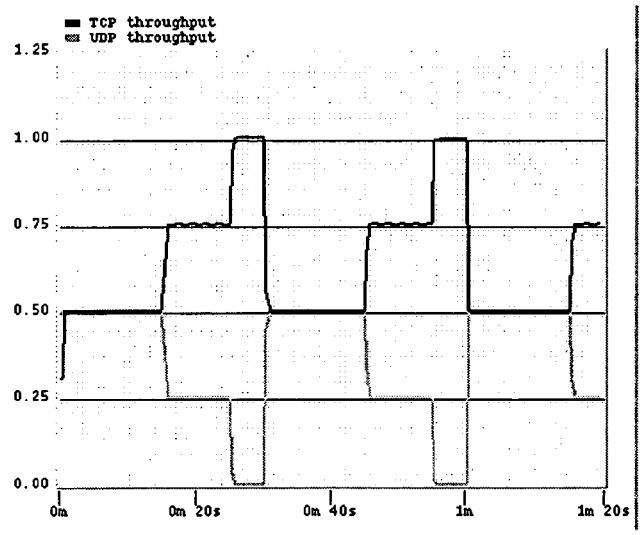
Figure 4 Throughput in 2QR-WRED

FAIR WRED FOR TCP UDP TRAFFIC MIX

FIELD OF THE INVENTION

This invention relates to congestion management at a buffer of a communication system and, more particularly, to systems and methods of managing congestion when traffic received at the buffer involves a mix of responsive (e.g. TCP) and non-responsive (e.g. UDP) traffic.

BACKGROUND

Congestion management of packet traffic at buffers in a communications system is important in as much as poor control can impact significantly on system performance. Management issues become a major concern when packet traffic includes a mix of packets from responsive traffic and non-responsive traffic.

Responsive traffic is typically generated by a source controlled by a responsive protocol. When packets are lost or excessively delayed, for example, due to congestion, a responsive protocol reduces the load in the attempt to match the available capacity. Transmission Control Protocol (TCP) is an example of a responsive protocol providing responsive traffic.

Non-responsive traffic is typically generated by a source controlled by a non-responsive protocol. When packets are lost or excessively delayed, a non-responsive protocol fails to detect or chooses to ignore this fact and, as a result, does not adjust the load accordingly. User Datagram Protocol (UDP) is an example of a non-responsive protocol providing non-responsive traffic.

A Random Early Detection (RED) algorithm is an active management mechanism for congestion avoidance. Contrary to a "tail drop" queue management scheme, this algorithm does not drop packets only when the queue overflows but it randomly discards packets earlier to notify sources about the incipient congestion. A Weighted RED (WRED) algorithm offers the same features as RED but it selectively drops packets according to their priorities.

The performance of a RED algorithm is believed to be better than the performance of traditional tail drop techniques. This is due to a better handling of bursty traffic and global synchronization. RED keeps the average queue size low, which can better accommodate occasional bursts of packets. RED also avoids synchronization of multiple TCP sources by avoiding (thanks to random discards) a situation in which several connections decrease their windows at the same time.

RED is widely implemented in routers. However, there are still outstanding issues with RED that have been extensively studied in the recent years. It has been shown that interactions between responsive TCP and non-responsive UDP traffic can bring instability to the system. Generally, the performance of TCP traffic is severely affected by UDP, if both types of traffic are handled by RED, in one memory partition. What happens is that UDP traffic gets its desired share of bandwidth, while TCP gets the rest—there is no fairness between the two types of traffic.

One solution to this problem is to hard-partition the memory, physically separating the two types of traffic. A TCP partition can use RED, while the UDP partition can use fixed thresholds to control the UDP traffic. This approach, however, can waste memory resources if one type of traffic is much more common than the other.

The Weighted RED algorithms presented in this application provide the solution in which the TCP and UDP traffic can be mixed together in a single partition, with a minimal impact on TCP traffic. In a sense, the two types of traffic are isolated even though they are stored in the same memory partitions. At the same time, complexity of the proposed algorithms is such that it is easy to implement them in hardware.

SUMMARY OF THE INVENTION

According to a first embodiment of the invention a WRED (Weighted Random Early Detection) algorithm can fairly accommodate TCP traffic when TCP and UDP packets share the same buffer. Traditional WRED implementations do not account for the differences in TCP and UDP behavior in response to packet discards. That is, TCP will react to packet discards by slowing down its transmission rate, whereas UDP will not react. This leads to UDP monopolizing the buffer bandwidth to the detriment of TCP traffic. The invention solves this problem by applying congestion control algorithms to TCP and UDP separately, where discard thresholds for UDP traffic are dynamically modified in a manner that limits UDP traffic to a provisioned percentage of the buffer's available bandwidth.

According to a second embodiment of the invention a Weighted Random Early Detection (WRED) algorithm fairly accommodates responsive (TCP) and non-responsive (UDP) traffic in two queues, arbitrated by a fair scheduler (e.g. a round-robin scheduler). Traditional WRED implementations do not distinguish between these two types of traffic. Since TCP sources react to random discards by slowing down their transmission rates, and UDP sources do not, this lack of differentiation between the two leads to a severe bias against TCP. Specifically, UDP flows occupy their desired bandwidth, while TCP flows get what is left over by UDP. This embodiment of the invention solves this problem by separating the two types of traffic in two queues kept in a shared memory, fairly arbitrating between them (e.g. by using a round-robin scheme), and by keeping separate counts of TCP and UDP packets to decrease the impact of UDP on TCP traffic. Notably, the buffer space is not wasted even if the arriving traffic is asymmetric (i.e., if packets of one type are more frequent than the other packets).

In general, a scheduler can be characterized as fair if it services the managed buffers according to predetermined allocations or parameters typically specified by the user. For example, a fair scheduler may service two queues with equal frequency (e.g. 50% vs. 50%) or it may service one queue more often than the other (e.g., 70% vs. 30%). In both cases, achieving the desired percentages as allocated to the two queues results in fairness.

Therefore, in accordance with a first aspect of the present invention a method of managing UDP and TCP traffic congestion in a buffer of a communications system by applying congestion control algorithms to UDP and TCP traffic separately, the method comprising: responsive to a UDP packet arriving at the buffer, the amount of space occupied by UDP packets in the buffer is compared with a UDP discard threshold, and responsive to the UDP discard threshold being exceeding, the arriving UDP packet is discarded; and responsive to a TCP packet arriving at the buffer, the TCP packet is discarded according to a discard probability which is determined according to an average occupancy of only TCP packets in the buffer (according to Weighted Random Early Detection).

According to a second aspect of the present invention there is provided a system for managing UDP and TCP traffic in a buffer of a communications system by applying congestion control algorithms to UDP and TCP traffic separately, the system comprising: means to compare the amount of space occupied by UDP packets in the buffer with a UDP discard threshold, upon receipt of an arriving UDP packet and if said discard threshold has been exceeded said arriving UDP packet is discarded; and means to discard arriving TCP packets at the buffer if a discard probability has been exceeded, the discard probability being determined according to an average occupancy of only TCP packets in the buffer (according to Weighted Random Early Detection).

According to a still further aspect of the present invention there is provided a method of managing traffic congestion on a communications resource operable to carry both UDP and TCP traffic, the method comprising: buffering incoming packets of UDP and TCP traffic in respective queues; fairly arbitrating between these queues (e.g. using a work-conserving, round-robin scheme), thereby providing a predetermined allocation of resource bandwidth to respective queues; and discarding packets from the queues in accordance with discard probabilities of a Weighted Random Early Detection (WRED) algorithm, the calculation being dependant on only TCP packets in the TCP queue.

In accordance with a still further aspect of the invention there is provided a system for managing traffic congestion on a communication resource carrying both UDP and TCP traffic, the system comprising: a shared memory for buffering incoming packets of UDP and TCP traffic in respective queues; a fair, work conserving scheduler (e.g. a work-conserving round-robin scheduler) to contribute between respective queues thereby providing a predetermined allocation of resource bandwidth to the respective queuing; and means to discard packets from the queues in accordance with WRED discard probabilities, the calculation of which are dependent on only TCP packets in the TCP queues.

In accordance with another further aspect of the invention, there is provided a method of managing traffic congestion in a buffer of a communications system by applying congestion control to responsive traffic and non-responsive traffic separately, the method comprising: if a packet arriving at the buffer is associated with non-responsive traffic, comparing the amount of space occupied by non-responsive traffic in the buffer to a non-responsive discard threshold and discarding the arriving packet if the non-responsive discard threshold is exceeded; and if the packet arriving at the buffer is associated with responsive traffic, the arriving packet is discarded according to a discard probability based on occupancy of only responsive traffic in the buffer.

In accordance with yet another further aspect of the invention, there is provided a system for managing responsive traffic and non-responsive traffic in a buffer of a communications system by applying congestion control to the traffics separately, the system comprising: means to compare the amount of space occupied by non-responsive traffic in the buffer with a non-responsive discard threshold and to discard an arriving non-responsive traffic packet if said non-responsive discard threshold has been exceeded; and means to discard arriving responsive traffic packets at the buffer if a discard probability has been exceeded, the discard probability being determined according to an average occupancy of only responsive traffic in the buffer.

BRIEF DESCRIPTION OF THE DRAWINGS

The invention will now be described in greater detail with reference to the attached drawings wherein:

FIG. 1 illustrates the architecture of a simulated system according to the present invention;

FIG. 2 illustrates the throughput of a basic WRED algorithm;

FIG. 3 shows the throughput of a first embodiment of the invention; and

FIG. 4 shows the throughput of a second embodiment of the invention.

DETAILED DESCRIPTION OF THE INVENTION

As shown in FIG. 1 the present invention relates to an architecture in which TCP and UDP sources send packets to respective TCP and UDP destinations via a buffer controlled by the WRED algorithms of the present invention.

One solution to the management process, which is not the preferred solution, is to separate TCP and UDP traffic into respective buffers and apply WRED to each buffer. This would work but it wastes resources or leads to unnecessary discarding because the UDP/TCP traffic mix would normally be changing over time, thereby making proper buffer size allocations difficult to predict. For example, the buffers could be made equal in size, but if there is no UDP traffic for a while and the TCP traffic exceeds its discard thresholds, then the discarding of TCP packets would be needless because space is available in the UDP buffer.

One of the preferred embodiments of the invention solves the problem of unfairness between responsive TCP and non-responsive UDP traffic by applying WRED to TCP and UDP separately. Specifically, the way TCP traffic is treated by WRED is similar to what was done in prior art, however UDP traffic is treated in a new way—it is limited by dynamically modified thresholds. These thresholds change depending on how much bandwidth UDP traffic wants to take, how much it currently uses, and how much bandwidth it is guaranteed. Thresholds set in this way assure that UDP traffic does not exceed the guaranteed limits imposed on its bandwidth and, as a result, the fairness between TCP and UDP traffic is preserved. At the same time, the two types of traffic share the available buffer space efficiently.

Complete details of this and a second embodiment of the invention including extensive simulation results are described in a soon to be published technical paper entitled "Fair treatment of mixed TCP and UDP traffic under WRED" by the inventors of the present application. The contents of the paper are incorporated herein by reference.

The invention includes two processes: the background process, called periodically every T, and the arrival process, called every time a packet arrives to the system. The arrival process uses results from the background process to determine whether to accept or discard each packet that arrives.

The arrival process is as follows:
  If the arriving packet is UDP, the process compares the amount of space occupied by UDP packets with the UDP threshold, which is calculated by the background process. If the UDP threshold is exceeded, the UDP packet is dropped. Otherwise, it is accepted.
  If the received packet is TCP, the process discards a packet with probability calculated by the background process.

There are two implementations of the background process. Both are similar and differ in only how the decision to adjust the UDP threshold is made. Both implementations keep separate sets of thresholds, one for TCP and the other for UDP traffic. TCP thresholds are fixed and, for the TCP traffic, the algorithm works similarly to the basic RED. UDP thresholds, however, are dynamically modified depending on the load of UDP traffic, load of TCP traffic, allowed fraction of the bandwidth that UDP can take, and the occupancy of the buffer.

The first implementation, called 1-Queue, Responsive-safe, Discard-based WRED (1QRD-WRED) first calculates the UDP capacity—the bandwidth that UDP traffic can take if there is TCP traffic flowing to the system. This value is a certain fraction, udp_limit, of the total available bandwidth, which is expressed as the number of bytes that departed from the system in the last period of length T. This fraction represents the percentage of the available bandwidth that UDP is guaranteed.

Then, the algorithm calculates the following values for the last period of length T:

1. the capped number of UDP bytes, udp_in_trunc, that arrived to the system, that is, the number of bytes possibly truncated to a udp_limit fraction of the available, current bandwidth;
2. the actual number of bytes, udp_in, that arrived to the system; and
3. the number of UDP bytes, udp_drop, dropped because they exceeded the UDP threshold.

Note the difference between 2 and 3, known as udp_eff, reflects how much bandwidth UDP actually gets.

If udp_eff is different than udp_in_trunc, the value by which the UDP threshold should change is calculated as:

$$\text{delta}=\text{udp\_in\_trunc}-\text{udp\_eff}=\text{udp\_in\_trunc}-(\text{udp\_in}-\text{udp\_drop})$$

For example, consider what happens when udp_eff is less than udp_in_trunc. In this case, the bandwidth that UDP gets (udp_eff) is less than what it is allowed to take (udp_in_trunc), therefore delta should be positive to allow a greater proportion of UDP traffic.

If udp_eff=udp_in_trunc, the algorithm compares two UDP occupancies: the current UDP occupancy cur_udp_occ, and occupancy prev_udp_occ from the previous period. If the current UDP occupancy is lower than the previous one, this means that the UDP source is less active than before. In this case, the threshold change (delta) is calculated as:

$$\text{delta}=\text{cur\_udp\_occ}-\text{prev\_udp\_occ}$$

The negative delta will lower the threshold by the difference between the two occupancies.

If the current occupancy is not lower than the previous one, delta is set to 0, and the UDP threshold remains unchanged.

Finally, if no UDP traffic has been observed in the last measurement period of length T, the UDP threshold is multiplied by a positive factor which is less than one. (e.g The UDP threshold may be halved.) If the UDP threshold was not decreased this way, leaving it at a possible high value could allow a large burst of UDP traffic to enter the system in the next active UDP period, and adversely affect the TCP performance.

The remaining part of the background process is very similar to the one used in basic RED from prior art with one exception. The difference is that now, only TCP traffic is considered in calculations of the average occupancy and discard probability, which are used to determine whether TCP packets should be accepted or discarded. This way, UDP traffic has only an indirect effect on TCP traffic. This effect comes down to latencies, perceived by TCP sources, increased by the presence of UDP packets in the buffer.

The second implementation of the background process, called 1-Queue, Responsive-safe, Rate-based WRED (1QRR-WRED), is very similar to 1QRD-WRED presented above.

The difference between them is that the second implementation, 1QRR-WRED, does not rely on packet discards to determine if the bandwidth taken by UDP traffic is sufficient for UDP needs. This decision is now based on the difference between the number of UDP bytes that leave the WRED system, udp_dep, and the number of UDP bytes that enter the system. The reasoning behind this approach is that when more UDP packets leave the buffer than arrive to the buffer, then most likely, UDP is getting more bandwidth than needed, and therefore the UDP threshold should be decreased. Conversely, when more UDP packets arrive to the buffer than leave it, then most likely, UDP is getting too little bandwidth, and therefore the UDP threshold should be increased.

The change to the UDP threshold, delta, introduced above, is now calculated as:

$$\text{delta}=\text{udp\_in\_trunc}-\text{udp\_dep}$$

In other words, delta is calculated as a difference between the truncated number of bytes that arrived to the system and the number udp_dep of bytes that left the system. The reasoning is the same as in the first implementation, 1QRR-WRED—the goal is to determine how much bandwidth the UDP stream wants, how much it actually gets, and to act accordingly by adjusting the threshold.

The arrival process is the same in 1QRR-WRED as that in 1QRD-WRED.

Simulations of the two implementations of the first embodiment, and their comparison with the basic WRED that does not distinguish between responsive and non-responsive flows, show how well the invention solves the problem of unfairness between UDP and TCP. For example, FIG. 2 shows the throughput of UDP and TCP traffic for the basic WRED in the following scenario. A TCP source continuously sends traffic at 100% of the bandwidth, beginning 5 seconds after the simulation is started. A UDP source sends traffic at 100% of the bandwidth for 15 seconds, 25% for 10 seconds, and remains idle for 5 seconds. Then, the whole cycle begins again.

Clearly, UDP traffic gets its desired share of bandwidth, while TCP gets the rest (or almost nothing, when UDP's load is 100%). As mentioned above, in a simple WRED, UDP can use any amount of bandwidth it can get. This is because of inherent properties of UDP and TCP protocols—UDP is aggressive, and TCP is not, yielding to UDP traffic. This results in the atrocious performance of TCP when it is mixed with a heavy UDP traffic.

The throughput of UDP and TCP streams in the same environment as above but now controlled by 1QRD-WRED algorithm is shown in FIG. 3. Although the throughput of UDP and TCP streams controlled by 1QRR-WRED has not been illustrated, results have shown that the throughput is more or less the same as that for 1QRD-WRED.

In accordance with a second embodiment of the congestion management process TCP and UDP packets are buffered in separate queues in a shared memory where they are arbitrated by a fair, work-conserving scheduler (e.g. a round-robin, work-conserving scheduler). This scheme alone ensures that each type of traffic is guaranteed 50% of the bandwidth, which is already an improvement over the basic RED algorithm.

This algorithm can be easily modified to guarantee different (than 50% each) amounts of bandwidth to each types of traffic. This goal can be achieved through a weighted fair, work-conserving scheduler (e.g. a round-robin, work-conserving scheduler). In this approach, the scheduler services packets from one queue type (TCP or UDP) more frequently than from the other queue type.

In this embodiment, calculations of discard probabilities, performed by WRED, involve only TCP packets—UDP packets are excluded. In this way, the presence of UDP packets in the shared memory (divided into two queues) does not increase probabilities with which TCP packets are discarded.

A static UDP threshold provides UDP sources with certain burst tolerance—the UDP traffic can burst up to the UDP thresholds. The higher the tolerance is needed, the higher the thresholds should be set.

In addition to providing burst tolerance to UDP traffic, the UDP threshold also assures that, in the absence of TCP traffic, UDP packets will not take over the entire memory space. Also, with the appropriate selection of WRED thresholds, and the UDP threshold, the utilization of memory can be optimized even if the traffic flowing to the system is asymmetric.

The throughput of UDP and TCP streams in the same environment as above but now controlled by 2QR-WRED algorithm is shown in FIG. 4.

In both of the processes, i.e. one or two queues, TCP and UDP fairly share the available bandwidth.

Although particular embodiments of the invention have been illustrated and described it will be apparent to one skilled in the art that numerous changes can be made to the basic concept. It is to be understood, however, that such changes will fall within the full scope of the invention as defined by the appended claims. For example, note that traffic of any responsive protocol may be used in place of the aforementioned TCP-based traffic, while any non-responsive protocol may be used in place of the aforementioned UDP-based traffic.

We claim:

1. A method of managing User Datagram Protocol (UDP) and Transmission Control Protocol (TCP) traffic congestion in a buffer of a communication system by applying congestion control algorithms to UDP and TCP traffic separately, the method comprising the following steps:
   dynamically calculating a UDP discard threshold that depends upon a load of TCP traffic and an allowed fraction of bandwidth that the UDP traffic occupies in the buffer;
   responsive to a UDP packet arriving at the buffer:
      comparing the amount of space occupied by UDP packets in the buffer with the UDP discard threshold, and responsive to the UDP discard threshold being exceeded, discarding the arriving UDP packet; and
   responsive to a TCP packet arriving at the buffers:
      discarding the arriving TCP packet according to a discard probability which is determined according to an average occupancy of only TCP packets in the buffer, wherein a TCP discard threshold is fixed.

2. The method as defined in claim 1 wherein the UDP discard threshold is dynamically modified in a manner that limits UDP traffic to a provisioned percentage of the buffer's available bandwidth.

3. The method as defined in claim 1 wherein the UDP discard threshold is determined using a responsive discard-based Weighted Random Early Detection (WRED) algorithm wherein the UDP discard threshold is based on bandwidth available to UDP traffic, and the UDP traffic received.

4. The method as defined in claim 3 wherein the algorithm bases the UDP discard threshold on an additional factor of an amount of traffic discarded because the amount of traffic had exceeded the UDP discard threshold.

5. The method as defined in claim 3 wherein the algorithm bases the UDP discard threshold on an additional factor of a difference between an amount of UDP traffic emitted from the buffer system and an amount of UDP traffic admitted to the buffer.

6. A system for managing User Datagram Protocol (UDP) and Transmission Control Protocol (TCP) traffic in a buffer of a communications system by applying a Weighted Random Early Detection (WRED) algorithm to UDP and TCP traffic separately, the system comprising:
   means to dynamically calculate a UDP discard threshold that depends upon a load of TCP traffic and an allowed fraction of bandwidth that the UDP traffic occupies in the buffer:
   means to compare an amount of space occupied by UDP packets in the buffer with a the UDP discard threshold, upon receipt of an arriving UDP packet when said discard threshold has been exceeded, discarding said arriving UDP packet; and
   means to discard arriving TCP packets at the buffer if a discard probability has been exceeded, the discard probability being determined according to an average occupancy of only TCP packets in the buffer, wherein a TCP discard threshold is fixed.

7. The system as defined in claim 6 wherein the UDP discard threshold is dynamically modified in a manner that limits UDP traffic to a provisioned percentage of the buffer's available bandwidth.

8. The system as defined in claim 6 wherein the UDP discard threshold is determined using a responsive discard-based WRED algorithm wherein the UDP discard threshold is based on bandwidth available to UDP traffic, and the UDP traffic received.

9. The system as defined in claim 8 wherein the algorithm bases the UDP discard threshold on an additional factor of an amount of traffic discarded because the amount of traffic had exceeded the UDP discard threshold.

10. The system as defined in claim 6 wherein the UDP discard threshold is determined using a responsive rate-based WRED algorithm wherein the UDP discard threshold is based on bandwidth available to UDP traffic, and the UDP traffic received.

11. The system as defined in claim 10, wherein the algorithm bases the UDP discard threshold on an additional factor of a difference between an amount of UDP traffic emitted from the buffer and an amount of UDP traffic admitted to the buffer.

12. A method of managing traffic congestion on a communications resource operable to carry both User Datagram Protocol (UDP) and Transmission Control Protocol (TCP) traffic, the method comprising:
   buffering incoming packets of UDP and TCP traffic in respective queues; dynamically calculating a UDP discard threshold that depends upon a load of traffic and allowed fraction of bandwidth that the UDP traffic occupies in the buffer;
   calculating discard probabilities for a Weighted Random Early Detection WRED algorithm based upon only TCP traffic;
   arbitrating between queues with a fair, work conserving scheduler thereby providing a predetermined allocation of resource bandwidth to respective queues, wherein the scheduler services TCP traffic more frequently than UDP traffic; and
   discarding packets from the queues in accordance with the discard probabilities.

13. The method as defined in claim 12 wherein a percentage of bandwidth allocated to the respective queues is programmable.

14. The method as defined in claim 12 wherein a static UDP threshold provides UDP sources with a burst limit and ensures that when TCP traffic is absent, UDP packets will not take over all bandwidth in the respective queues.

15. The method as defined in claim 12 wherein utilization of shared memory of the respective queues can be optimized by appropriate selection of WRED thresholds even if the traffic flowing to the system is asymmetric.

16. A system for managing traffic congestion on a communication resource carrying both User Datagram Protocol (UDP) and Transmission Control Protocol (TCP) traffic, the system comprising:
- a shared memory for buffering incoming packets of UDP and TCP traffic in respective queues; dynamically calculating a UDP discard threshold that depends upon a load of traffic and allowed fraction of bandwidth that the UDP traffic occupies in the buffer;
- means to calculate discard probabilities For a weighted Random Early Detection (WRED) algorithm based upon only TCP traffic:
- a fair, work conserving scheduler to contribute between respective queues thereby providing a predetermined allocation of resource bandwidth to the respective queuing, wherein the scheduler services TCP traffic more frequently than UDP traffic; and
- means to discard packets from the queues in accordance with WRED discard probabilities.

17. The system as defined in claim 16 wherein a percentage of bandwidth allocated to the respective queues is programmable.

18. The system as defined in claim 16 wherein a static UDP threshold provides UDP sources with a burst limit and ensures that, when TCP traffic is absent, UDP packets will not take over all bandwidth in the respective queues.

19. The system as defined in claim 16 wherein utilization of shared memory of the respective queues can be optimized by appropriate selection of WRED thresholds even when the UDP traffic is not equal to the TCP traffic.

20. A method of managing traffic congestion in a buffer of a communications system by applying congestion control to responsive traffic and UDP traffic separately, the method comprising:
- calculating a discard threshold that depends upon a UDP load of TCP traffic:
- when a packet arriving at the buffer is associated with UDP traffic, comparing the amount of space occupied by UDP traffic in the UDP buffer to the discard threshold and discarding the arriving packet when the UDP discard threshold is exceeded; and
- when the packet arriving at the buffer is associated with TCP traffic, discarding the arriving packet according to a discard probability based on occupancy of only TCP traffic in the buffer, wherein a TCP discard threshold is fixed.

21. A system for managing TCP traffic and UDP traffic in a buffer of a communications system by applying congestion control to the traffics separately, the system comprising:
- means to calculate a UDP discard threshold that depends upon a load of TCP traffic;
- means to compare the amount of space occupied by UDP traffic in the buffer with the UDP discard threshold and to discard an arriving UDP traffic packet when said UDP discard threshold has been exceeded; and
- means to discard arriving TCP traffic packets at the buffer when a discard probability has been exceeded, the discard probability being determined according to an average occupancy of only TCP traffic in the buffer, wherein a TCP discard threshold is fixed.

22. The method as defined in claim 12, wherein the fair, work conserving scheduler is a round-robin work conserving scheduler.

23. The system as defined in claim 16, wherein the fair, work conserving scheduler is a round-robin work conserving scheduler.

* * * * *

UNITED STATES PATENT AND TRADEMARK OFFICE
CERTIFICATE OF CORRECTION

PATENT NO. : 7,616,573 B2 Page 1 of 1
APPLICATION NO. : 10/864365
DATED : November 10, 2009
INVENTOR(S) : Olesinski et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1044 days.

Signed and Sealed this

Fourteenth Day of December, 2010

David J. Kappos
*Director of the United States Patent and Trademark Office*